United States Patent [19]

Schumacher

[11] Patent Number: 5,158,127

[45] Date of Patent: Oct. 27, 1992

[54] TEMPORARY COVERING FOR A WINDOW OR THE LIKE

[76] Inventor: Donald W. Schumacher, 2113 W. Steele La., Santa Rosa, Calif. 95403

[21] Appl. No.: 668,277

[22] Filed: Mar. 11, 1991

[51] Int. Cl.$^5$ .............................. E06B 9/06
[52] U.S. Cl. ................... 160/84.1; 160/368.1
[58] Field of Search ............. 160/84.1, 368.1, 354; 24/563, 562

[56] References Cited

U.S. PATENT DOCUMENTS

| | | |
|---|---|---|
| 2,874,612 | 2/1959 | Luboshez ..................... 160/84.1 |
| 3,913,655 | 10/1975 | Ogino . |
| 4,562,675 | 1/1986 | Baigas, Jr. . |
| 4,775,180 | 10/1988 | Phillips . |
| 4,836,265 | 6/1989 | Bussert . |
| 4,865,106 | 9/1989 | Wichelman ................. 160/84.1 |
| 4,909,299 | 3/1990 | Bussert . |

Primary Examiner—Blair M. Johnson
Attorney, Agent, or Firm—Flehr, Hohbach, Test, Albritton & Herbert

[57] ABSTRACT

A temporary covering for a window or the like, including an elongate paper-like sheet having equidistant parallel pleats defined by creases extending across the sheet. An adhesive fastening strip is located at the top end of the sheet for fastening the sheet to a window, window frame, or the like. When mounted to window or window frame, the temporary window covering extends downwardly to a selected variable length, while maintaining a pleated appearance.

8 Claims, 3 Drawing Sheets

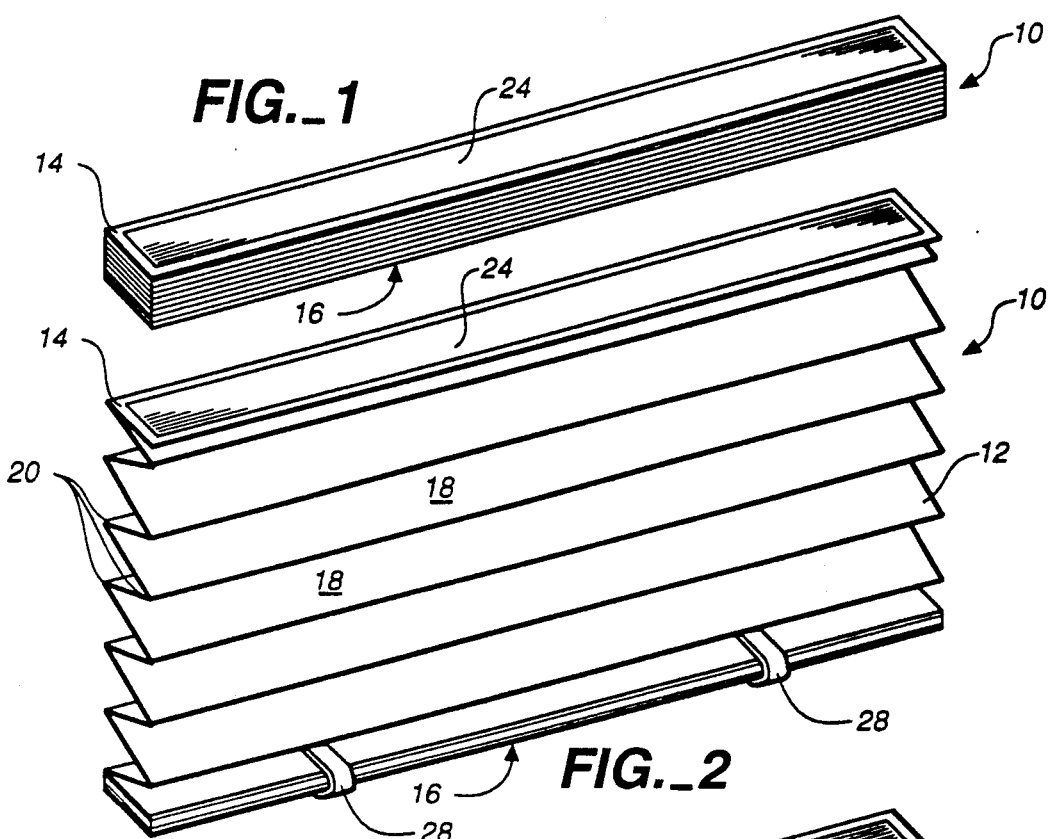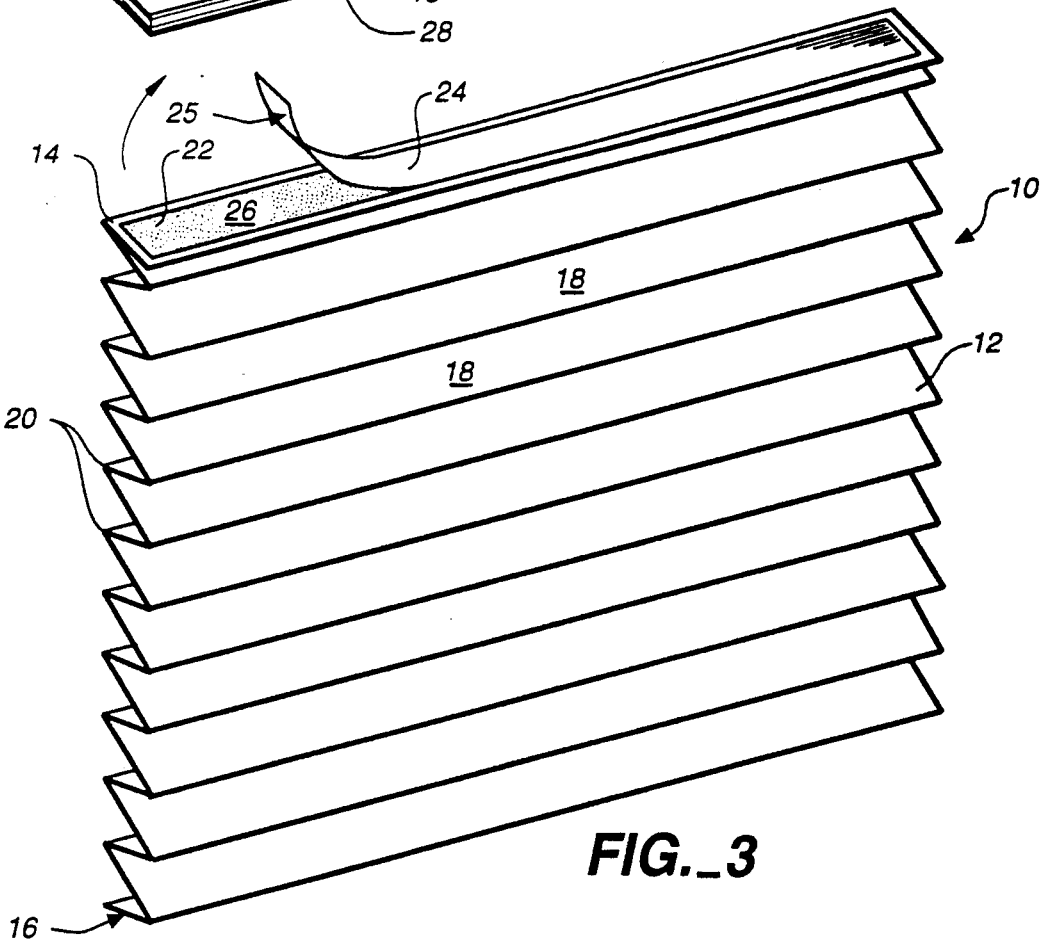

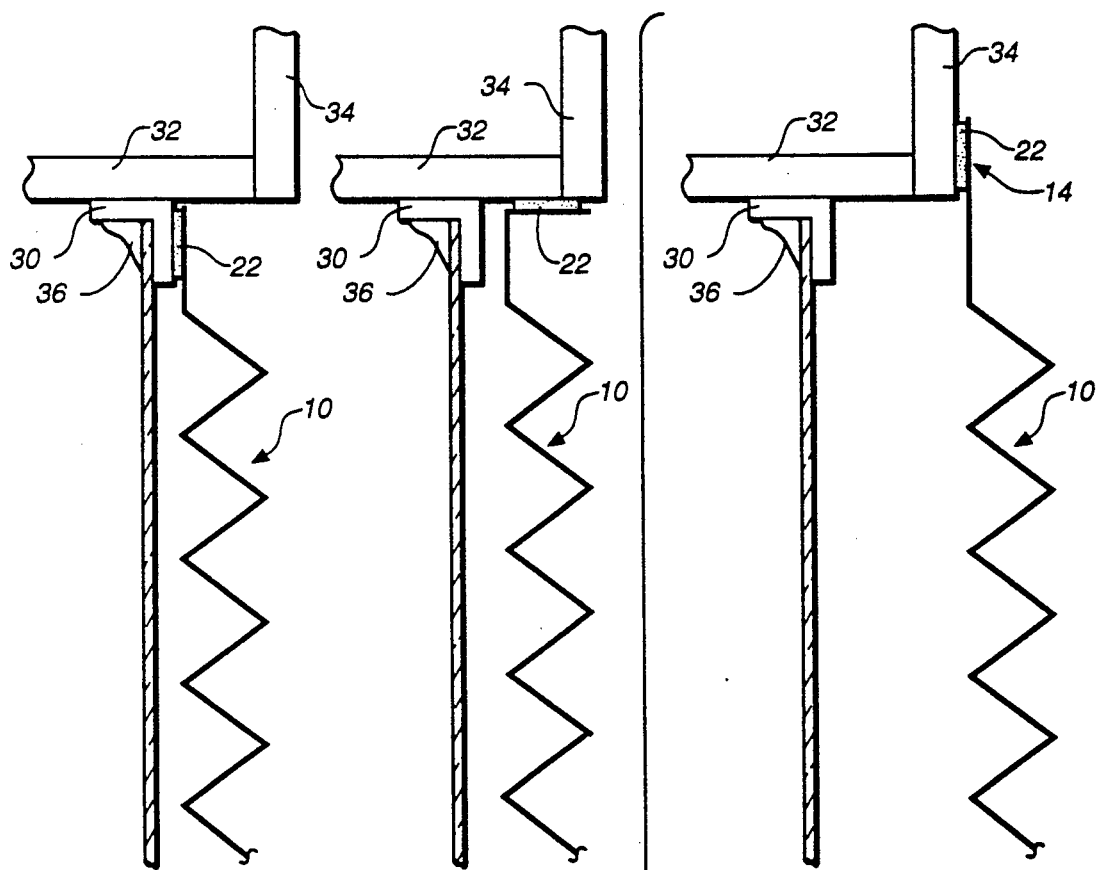
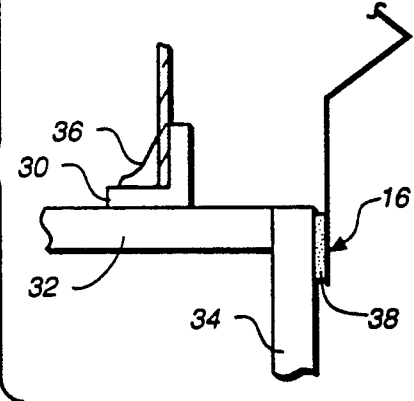
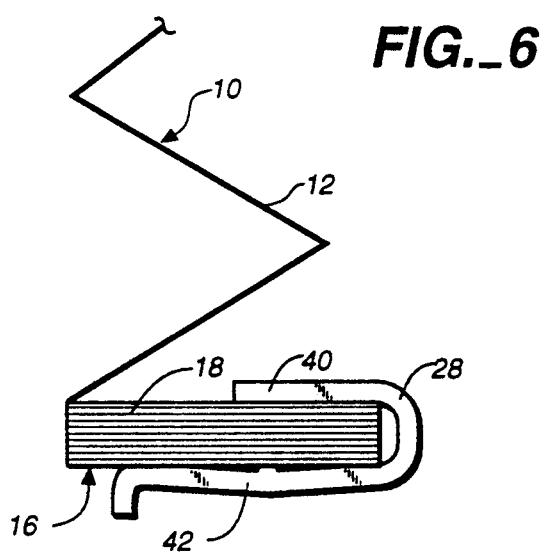

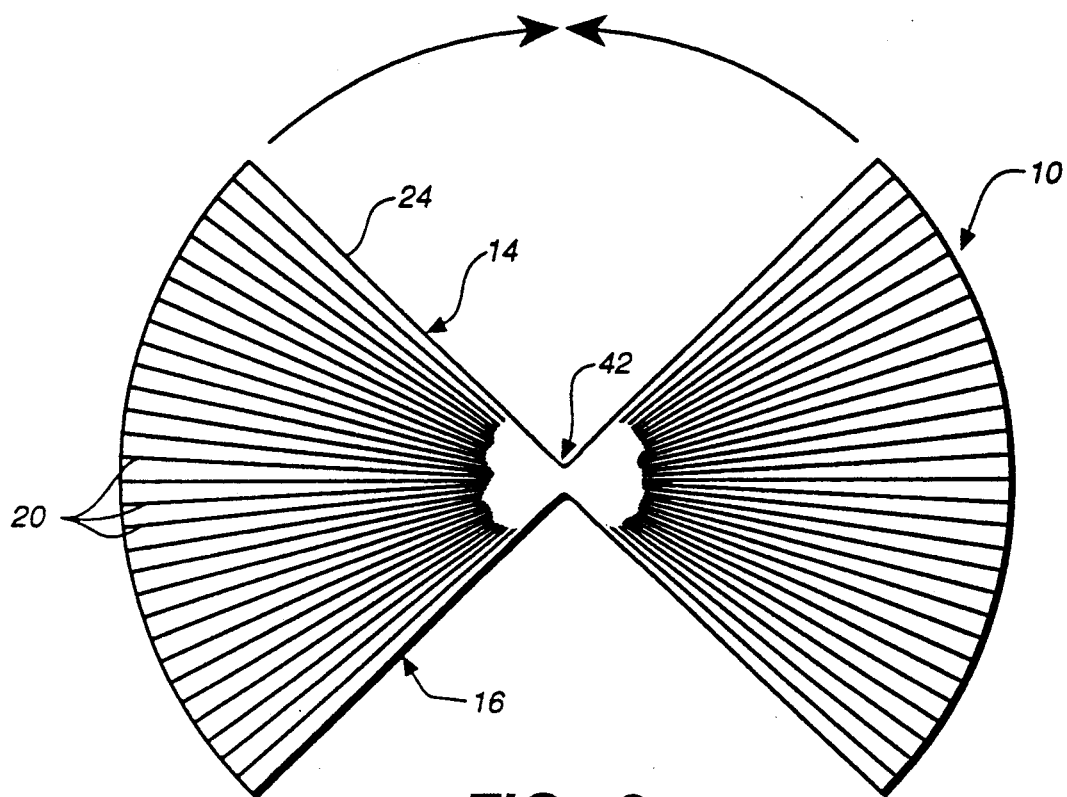
FIG._8
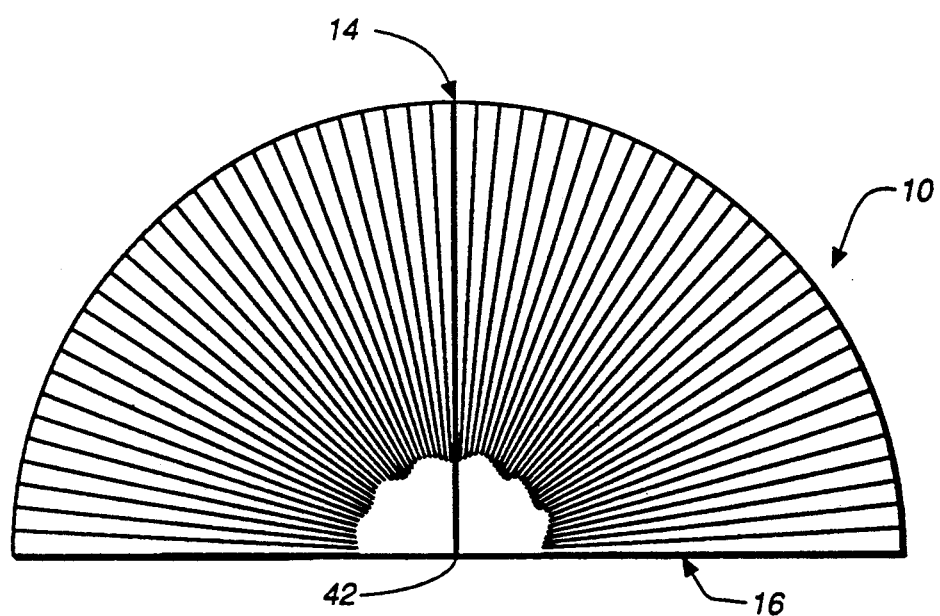
FIG._9

TEMPORARY COVERING FOR A WINDOW OR THE LIKE

FIELD OF THE INVENTION

This invention relates to a novel covering for use with permanently sealed windows, sliding glass windows and doors, casement windows and the like. More specifically, this invention relates to a temporary window covering which may be selectively raised to permit passage of light into a room or other space or, alternatively, which may be selectively lowered to obstruct view into a room or other space.

BACKGROUND

In general, adjustable draperies and/or blinds are mounted to permanently sealed windows, sliding glass windows and doors, casement windows, and the like to selectively cover the window. However, new homes and rental properties are often unfurnished and, initially, do not include window draperies or blinds. Since draperies are somewhat expensive and are usually purchased for long-term use, homeowners and renters may take several weeks or more to actually purchase and install permanent draperies. This is especially true if the draperies are custom-made. In addition, choosing permanent draperies often takes time because draperies are available in a wide variety of fabrics, designs, and color schemes. Consequently, new homeowners and renters may face both lack of privacy and an inability to block light shining through the windows for a long period of time.

The above-mentioned problems associated with uncovered windows are not restricted to new homeowners and renters. If permanent draperies need to be removed for replacement, restitching, or cleaning, home and apartment occupants must contend with lack of privacy and passage of light through the uncovered window.

In an effort to temporarily solve the above-mentioned problems, occupants will frequently drape fabric sheets in front of the windows or tape opaque paper, such as newspaper, to the window panes. These solutions, however, are unsatisfactory because such temporary window coverings are unsightly. In addition, these temporary window coverings cannot be easily raised and lowered to vary the amount of light shining into the room or to enable the occupant to view outdoors.

A temporary drapery or curtain kit, as described in U.S. Pat. No. 3,913,655, was designed to alleviate the aforementioned problems associated with prior temporary window coverings. More specifically, the temporary drapery kit includes a first stiffener strip attached to the top end of paper curtain sheet and a second stiffener strip attached to the bottom end. The first stiffener strip is coated with an adhesive to adhesively secure the drapery to a window frame or a wall adjacent a window frame. The second stiffener strip serves to weight the bottom of the temporary drapery to ensure that the drapery hangs correctly. The drapery may be selectively raised and lowered by pulling on a cord which is threaded through a series of spaced apart holes bored along one side of the sheet and through the stiffener strips. Although this temporary drapery permits an occupant to change the vertical hanging length of the drapery, the process of boring holes in the stiffener strips and the sheet and threading the cord through the holes increases manufacturing costs, assembly time, and complexity of the drapery.

In the recent past, a bendable sheet was designed which is easier to manufacture and has fewer parts than the temporary drapery kit discussed above. The bendable sheet, as disclosed in U.S. Pat. No. 4,909,299, includes a column of apertures disposed along each opposed vertical side of the sheet. A pair of clips, secured to the lower edge of the sheet, penetratably cooperate with the apertures to permit the sheet to be selectively folded and raised to a fixed number of predetermined heights. Although the bendable sheet is easy to assemble and inexpensive to manufacture, an occupant may only raise or lower the sheet to set fixed positions, as determined by the positioning of the apertures. Moreover, when the sheet is raised to a position near the top of the window frame, the sheet must be folded over multiple times onto itself which results in a bulky, unfinished, aesthetically displeasing appearance. In addition, the bendable sheet is generally rectangular and is, thus, limited to use with rectangular-shaped windows.

These difficulties are among many which may tend to reduce the effectiveness of prior temporary window coverings. Other noteworthy problems may also exist; however, those presented above should be sufficient to demonstrate that such temporary window coverings appearing in the past will admit to worthwhile improvement.

SUMMARY OF THE INVENTION AND OBJECTS

It is a general object of the invention to provide a temporary covering for a window or the like which will obviate or minimize difficulties of the type previously described.

It is a specific object of the invention to provide a temporary window covering which may be releasably mounted to a window, window frame, or wall surface adjacent a window.

It is another object of the invention to provide a temporary window covering which may be selectively raised to permit passage of light into a room or other space or, alternatively, which may be selectively lowered to block view into a room or other space.

It is still another object of the invention to provide a temporary window covering which may be fastened to varying sized windows and windows having various geometrical patterns.

It is a further object of the invention to provide a temporary window covering which hangs in a vertically extended position without the addition of weighted or stiffening devices.

It is yet a further object of the invention to provide a temporary window covering which is inexpensive to manufacture, easy to install, portable, recyclable, reusable, may be compactly stored, and has a minimum number of parts.

A preferred embodiment of the invention which is intended to accomplish at least some of the foregoing objects includes an elongate paper-like sheet having a top end, a bottom end, and a plurality of equidistant parallel pleats defined by creases extending transverse to the sheet. An adhesive fastener is attached to the top end of the sheet for mounting the sheet to a window, window frame, or wall surface.

The sheet is compressible to a compact, tight mass in which adjacent pleats foldably contact each other. When the sheet is attached to the top of a window, the sheet extends downwardly from its top end to a selected variable length, while concomitantly maintaining a pleated appearance without any weighted stiffener at its bottom end.

In another aspect of the invention, the subject temporary window covering includes a clip for releasably clipping together multiple pleats at the bottom end of the sheet. In this manner, the sheet may be selectively raised and lowered between a fully retracted position and a fully extended position and anywhere inbetween.

BRIEF DESCRIPTION OF THE DRAWINGS

Other objects and advantages of the present invention will become apparent from the following detailed description of a preferred embodiment thereof taken in conjunction with the accompanying drawings, wherein:

FIG. 1 is a top perspective view of the subject temporary window covering in a compressed storage position in accordance with a preferred embodiment of the invention;

FIG. 2 is a top perspective view of the subject temporary window covering in a partially extended position;

FIG. 3 is a top perspective view of the subject temporary window covering in a fully extended position;

FIG. 4 is a fragmentary side elevation view, in cross section of the subject temporary window covering mounted to a window frame;

FIG. 5 is a fragmentary side elevation view, in cross section, of the subject temporary window covering in an alternative mounting arrangement;

FIG. 6 is a side elevation view, in cross section, of the subject temporary window covering in a further alternative mounting arrangement;

FIG. 7 is a side elevation, detail view of the bottom end of the subject temporary window covering showing multiple pleat fastened in a clip;

FIG. 8 is a front elevation view of the subject invention and shows extension of the window covering to form a circular pattern; and FIG. 9 is a front elevation view of the subject invention and shows extension of the window covering in a semi-circular pattern.

DETAILED DESCRIPTION OF THE PREFERRED EMBODIMENTS

Referring now to the drawings, wherein like numerals indicate like parts, and initially to FIGS. 1-3, there will be seen a temporary window covering, generally designated 10, in accordance with a preferred embodiment of the invention. Window covering 10 includes an elongate paper-like sheet 12 having a top end 14, a bottom end 16, a plurality of equidistant, parallel pleats 18 defined by creases 20 extending transverse to sheet 12. In a preferred embodiment, each pleat is approximately 1¼ inches wide for easy manageability. Elongate sheet 12 is composed of an opaque, creasable paper material, preferably a protective plastic coated paper material, which is of a character and thickness to be cutable along its length or width with ordinary scissors to accommodate varying sized windows. In addition, paper-like sheet 12 is somewhat tear-resistant which reduces the likelihood of damaging the sheet during removal or re-application, thereby increasing the potential for repeated use. The material should have sufficient resiliency to maintain the pleats after repeated raising and lowering of the window covering. Other paper-like sheet material can be used such as hi-gloss paper or lightweight fabric.

Adhesive means is the pressure sensitive adhesive strip 22 is provided at top end 14 of sheet 12 for releasably mounting sheet 12 to a window, window frame, and the like. Adhesive strip 22 is coated with a pressure-responsive adhesive material which will support the weight of sheet 12, yet does not adhere to or leave residue on the surface to which the window covering is applied. A removable protective strip 24 having a waxy, non-adhesive lower surface 25 covers adhesive strip 22 and, prior to mounting sheet 12 to a window frame and the like, protective strip 24 may be peeled from adhesive strip 22 to expose adhesive surface 26, as shown by the arrow in FIG. 3. A suitable adhesive-protective strip for use with the subject temporary window covering is sold by 3M Corporation under the trade name POSTER TAPE. The adhesive is preferably of a type which can be applied a number of times without leaving a residue.

Referring particularly to FIG. 1, when temporary window covering 10 is purchased, sheet 12 is in a compressed state, preferably in a decorative tube or thin elongate protective cardboard box (dimension 1¼"×1¼"×3 or 4'), or the like, not shown. In this compressed position, parallel pleats 18 foldably contact each other to form a portable, compact box-like package.

Turning to FIG. 2, bottom end 16 is shown freely extending away from top end 14. When window covering 10 is mounted to a window frame, elongated sheet 12 vertically unfolds in pleats 18 due the weight of paper sheet 12. Sheet 12 may be positioned at any intermediate vertical position between a fully retracted position, as shown in FIG. 1, and a fully extended position, as shown in FIG. 3, by clipping multiple pleated folds of bottom end 16 of sheet 12 together with clips 28. In this manner, a user may adjust window covering 10 to a selected variable length while maintaining the pleated appearance of sheet 12. In order to ensure evenness of bottom end 16, a clip 28 is positioned on both sides of bottom end 18; however, the number of clips 28 attached to bottom end 18 may vary depending on the width of sheet 12. In an alternative embodiment, pleats 18 at bottom end 16 may be fastened together with an adhesive tape, such as masking tape.

When positioned in front of a window in the fully extended position of FIG. 3, sheet 12 blocks passage of light through an associated window and blocks view into the room or other occupied space, thereby lending privacy to the occupant. In addition, sheet 12 operably absorbs and stores radiant heat from the sun which would otherwise stream through the uncovered glass window. In the absence of a window covering, radiant heat could imbalance the room temperature equilibrium in the house, apartment, or other interior space. More specifically, a room having uncovered windows would heat from radiant energy passing through the glass panes, causing the temperature in the room to rise with respect to rooms having no windows. This difference in ambient air temperature between rooms could cause discomfort to the occupants or could overwork conditioned air systems.

In addition to the above-described temperature problem, interior surfaces, such as book covers, furniture, paintings, or newspapers, which are exposed to direct sunlight can become damaged or discolored. The subject window covering protects these interior surfaces from damage due to radiant energy.

From an aesthetic aspect, the paper sheet may be colored, patterned, textured, or imprinted with a design which may be viewed when the sheet 12 is in the extended position shown in FIG. 3. Cartoon characters or other animated figures may be printed on the temporary window covering for use as a poster in a child's room. Alternatively, a printed window covering in accordance with the subject invention may be applied to a ceiling and used as a decorative room divider, or applied to a door frame for use as a closet covering. In addition, the window covering may be releasably attached to the ceiling of a room to serve as a baby's changing room screen or a dressing/changing room curtain.

FIGS. 4-6 illustrate alternative mounting arrangements for releasably fastening the subject temporary window covering 10 to a window frame 30, window casement 32, or adjacent wall surface 34, respectively. Typically, windows are vertically positioned in a window frame which, in turn, is secured within a window casement. Putty material, here designated 36, is applied to the edges of the window to secure the window against the window frame and to prevent water leakage into the interior of a house, apartment, or other building structure. As mentioned above and illustrated in FIGS. 4-6, in order to ensure privacy and to selectively control passage of light through window 36, the subject temporary window covering 10 may be releasably fastened to a window, window frame, or any substantially flat wall surface.

Focusing particularly on FIG. 6, there will be seen an alternative embodiment of the subject window covering which has a second adhesive strip 38 affixed to bottom end 16 of sheet 12 for securing window covering to the bottom of window frame 30. This embodiment is particularly useful in the construction industry. More specifically, during construction of a home or building, temporary window coverings, such as plastic sheets, are draped across window casements to insulate the interior space from external temperature changes. In the subject invention, inclusion of a second adhesive strip 38 permits the subject window covering 10 to be releasably secured in front of an entire window face to insulate an associated interior space. An additional advantage of second adhesive strip 38 is that, if first adhesive strip 22 is applied to a dusty surface or otherwise loses its adhesive properties, second adhesive strip 38 provides an additional adhesive surface for attaching window covering 10 to a window frame.

The subject window covering may also be useful during painting, remodeling, or cleaning of a house when the home dweller does not want to risk damage to permanent draperies or curtains. If a window is accidentally broken, window covering 10 may provide a blockage against adverse weather conditions. Window covering 10 also would prevent dust and pollen particles from filtering in through the broken window.

Another possible use for the subject temporary window covering is to suspend the window covering in front of windows in a greenhouse to provide a light filter for plants.

If a user desires to save window covering 10 for later possible use, the user may collapse pleats 18 on top of each other to store compact sheet 12 in the compressed position shown in FIG. 1. If, however, the user wishes to discard the window covering 10, the paper material of sheet 12 may be recycled.

Turning to FIG. 7, clip 28 is shown clipped to and binding a plurality of pleats 18 at bottom end 16. Clip 28 is preferably made from plastic or a similar slightly flexible, lightweight, resilient material. Clip 28 is curved to receive a compressed plurality of pleats 18 to permit a user to reduce the extended length of sheet 12 and selectively raise sheet 12 to permit passage of light through an associated window. Clip 28 generally includes a short arm 40 for placement above compressed pleats 18 and a slightly flexible long arm 42 for providing support to compressed pleats 18. Other temporary clipping means could be used such as metal spring clips or paper clips.

The subject window covering 10 may be arranged to accommodate various shaped windows and to produce various designs by strategically clipping certain pleats together with clips 20. For example, by permitting one side of sheet 12 to hang in pleats 18 and clipping the other side of sheet at approximately its half point, one half of a curtain panel can be achieved.

As seen in FIG. 8, the pleated structure of sheet 12 enables the sheet to be fanned in the direction of the arrows from a central pivot point, generally designated 42, to form a circular pattern for covering a circular window. Here, top end 14 and bottom end 16 each form a pair of pivot arms. Each pivot arm extends from pivot point 42 outward along end 14 or 16 to the edge of sheet 12. The pivot arms may be adhesively secured together by removing adhesive strip 24 or, alternatively, pivot arms may be clipped together with a plurality of clips 28.

As is evident in FIG. 9, if the pivot arms of top end 14 are brought together and bottom end 16 remains substantially flat, a semi-circular pattern is formed. As mentioned in conjunction with FIG. 8, pivot arms of top end 14 may be adhesively secured or clipped together. By removing the protective strip from bottom end 16 of sheet 12, window covering 10 may be releasably secured to a window ledge or an adjacent wall surface which extends into a room parallel to the floor.

In addition, by combining a fully extended paper sheet with a sheet arranged in a semi-circular pattern, an elongated window having an upper arched portion, which is a popular geometric design of modern windows, may be temporarily covered by the subject invention.

The subject window covering may also be used as an entryway cover, a shelf cover, or a pantry cover. In addition, suspending the window covering in areas having a high concentration of dirt or grease, such as a garage, workshop area, or kitchen, may prove desirable.

Utility of the subject window covering also extends to use as a banner for store advertisements. The window covering may also be printed with an emergency symbol to indicate, for example, a handicapped person in residence.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

I claim:

1. A temporary covering for hanging over windows or the like comprising:
    an elongated paper-like sheet having top and bottom ends, said sheet including equidistant parallel pleats defined by creases extending across said sheet, said sheet including adhesive fastening means at its top end for fastening to a window or window frame, each parallel pleat being stackable defining a tight mass when compressed in which adjacent pleats contact each other, and, when adhered by said fastening means to the top of a window or window frame, being extendible downwardly from its top end to a selected variable length dependant on the number of stacked parallel pleats, said sheet maintaining a pleated appearance without any weighted stiffener at its lower end; and clipping means for clipping together multiple folds of said pleats at the sheet bottom end with the unclipped portion toward the top edge of the sheet extending in a vertical direction thereby reducing the extended length of said sheet.

2. The temporary covering of claim 1 wherein:
said sheet is formed of thin paper capable of being cut to size by a pair of scissors.

3. The temporary covering of claim 1 further comprising:
window frame means and a window, said adhesive fastening means being adhered at its top end to the top of said window frame means or window.

4. The temporary covering of claim 1 wherein:
said sheet is free of draw strings.

5. The temporary covering of claim 1 wherein:
said temporary covering is free of stiffening means at its bottom end.

6. The temporary covering of claim 1 wherein:
said temporary covering is free of weighted stiffening mean at its top end.

7. The temporary covering of claim 1 wherein:
said sheet is capable of being fanned at a pivot point comprising the center of its top or bottom ends to from two pivot arms which pivot to contact each other in a semi-circular pattern for covering a semi-circular arched window.

8. The temporary covering of claim 7 wherein:
when said pivot arms are pivoted to contact each other, said temporary covering further comprises means adhering said contact pivot arms to each other.

* * * * *

UNITED STATES PATENT AND TRADEMARK OFFICE
CERTIFICATE OF CORRECTION

PATENT NO. : 5,158,127

DATED : October 27, 1992

INVENTOR(S) : Donald W. Schumacher

It is certified that error appears in the above-identified patent and that said Letters Patent is hereby corrected as shown below:

Column 8, line 15, delete "from", and insert --form--.

Column 8, line 16, following "semi-circular", insert --arch--.

Signed and Sealed this

Twenty-eighth Day of September, 1993

Attest:

BRUCE LEHMAN

Attesting Officer        Commissioner of Patents and Trademarks